United States Patent

Goupil, Jr.

(10) Patent No.: US 7,485,168 B2
(45) Date of Patent: Feb. 3, 2009

(54) CABIN AIR FILTER

(75) Inventor: Gerald M. Goupil, Jr., N. Tonawanda, NY (US)

(73) Assignee: Delphi Technologies, Inc., Troy, MI (US)

( * ) Notice: Subject to any disclaimer, the term of this patent is extended or adjusted under 35 U.S.C. 154(b) by 609 days.

(21) Appl. No.: 11/190,469

(22) Filed: Jul. 27, 2005

(65) Prior Publication Data

US 2007/0022721 A1 Feb. 1, 2007

(51) Int. Cl.
 *B01D 46/00* (2006.01)
(52) U.S. Cl. ............ 55/385.1; 55/385.3; 55/422; 55/471; 55/529; 55/520; 55/521; 55/418; 55/420; 454/139; 454/158
(58) Field of Classification Search ............. 55/385.1, 55/385.3, 422, 471, 529, 418, 420, 520, 521; 454/139, 158
See application file for complete search history.

(56) References Cited

U.S. PATENT DOCUMENTS

| | | | | |
|---|---|---|---|---|
| 2,335,456 A | * | 11/1943 | Seitz | ............ 261/78.2 |
| 3,011,336 A | * | 12/1961 | Weiss | ............ 73/863.12 |
| 3,870,495 A | | 3/1975 | Dixson et al. | ............ 55/489 |
| 4,198,217 A | * | 4/1980 | Erdmannsdorfer | ......... 55/385.5 |
| 6,425,819 B2 | * | 7/2002 | Maruyama et al. | ........... 454/139 |
| 6,569,009 B2 | * | 5/2003 | Nishikawa et al. | ........... 454/121 |
| 2002/0013128 A1 | | 1/2002 | Maruyama et al. | ........... 454/139 |

FOREIGN PATENT DOCUMENTS

| EP | 2063764 | 7/1972 |
|---|---|---|
| EP | 19603456 A1 | 8/1996 |

OTHER PUBLICATIONS

EP 06 07 6230, European Search Report dated Oct. 31, 2006.

* cited by examiner

*Primary Examiner*—Duane S Smith
*Assistant Examiner*—Minh-Chau T Pham
(74) *Attorney, Agent, or Firm*—Patrick M. Griffin

(57) ABSTRACT

The invention provides an air filter assembly including an air filter extending along a central axis from a first end to a second end. The air filter decreases in width along the central axis from the first end to the second end. The air filter assembly also includes a filter housing partially enclosing the air filter and defining an aperture adjacent to the second end. One or more airstreams can be directed through the aperture to the air filter. The air filter assembly also includes at least one valve member rotatable about a rotation axis. The valve member pivots around the second end to block at least a portion of the aperture.

3 Claims, 1 Drawing Sheet

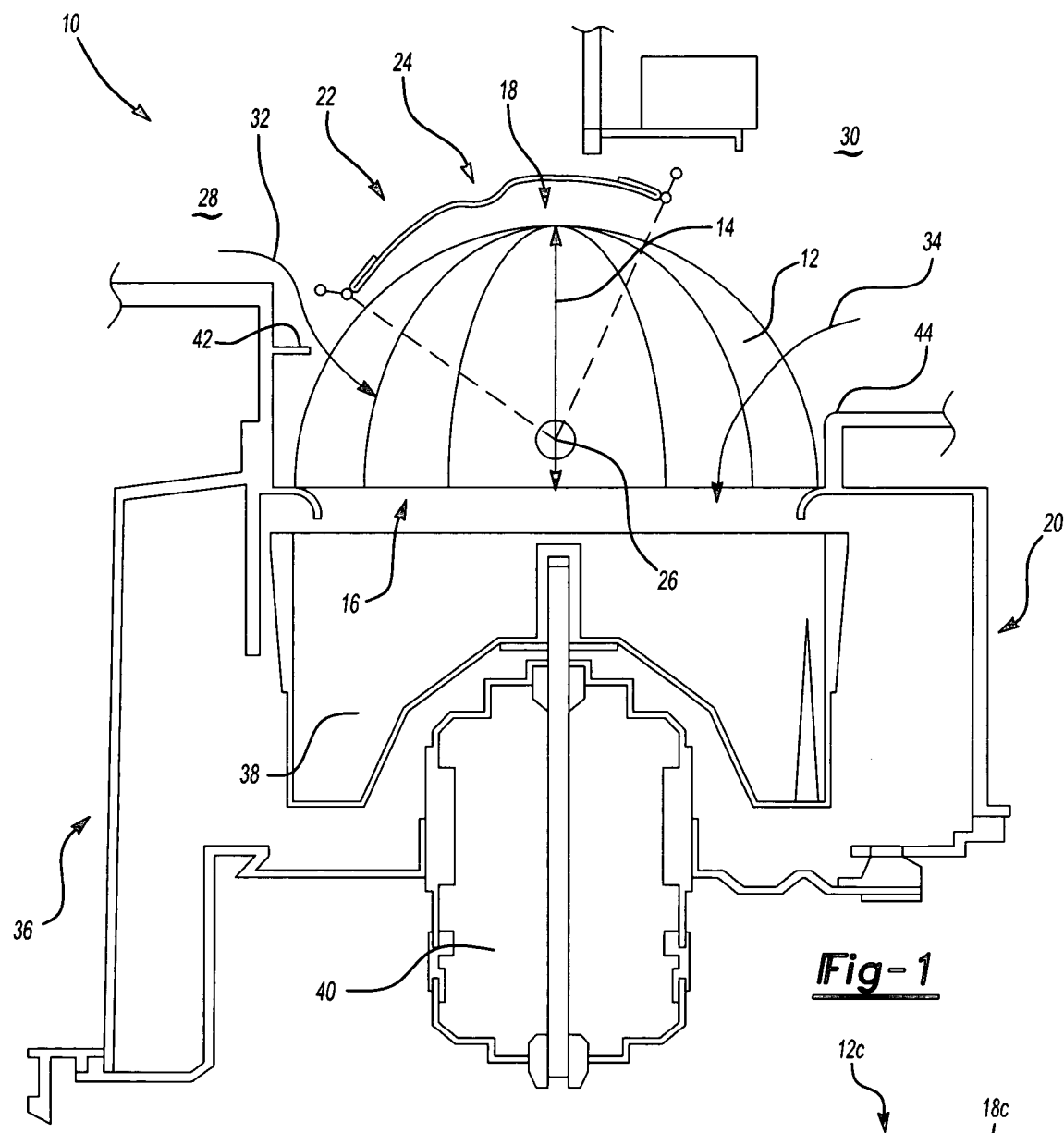
Fig-1
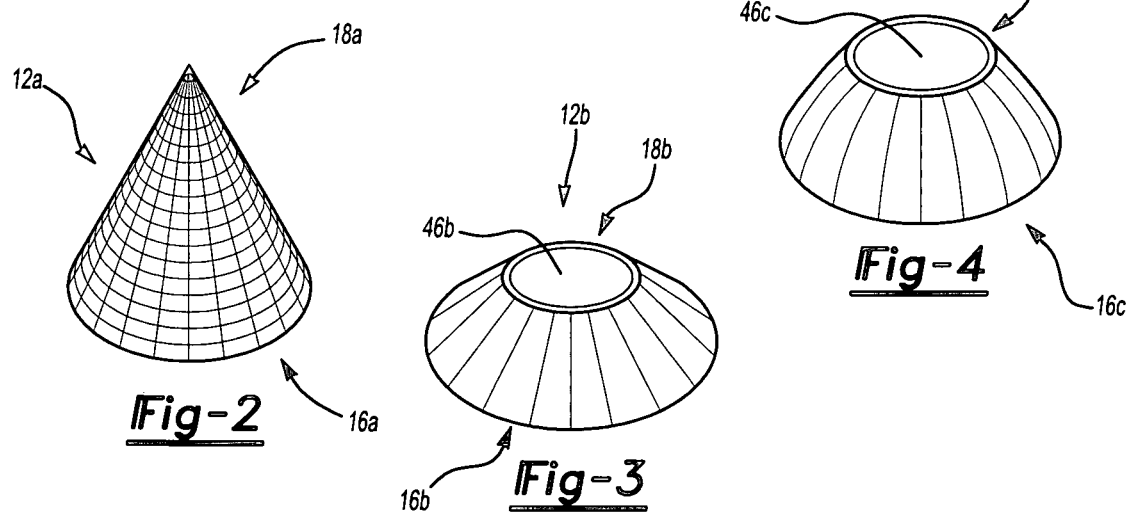
Fig-2
Fig-3
Fig-4

CABIN AIR FILTER

FIELD OF THE INVENTION

The invention relates to an air filter for filtering cabin air of a vehicle and more particularly to an air filter assembly for controlling air flow through the air filter.

BACKGROUND OF THE INVENTION

Fluid streams often carry particulate material. In some operating environments, it is desirable to remove some or all of the particulate material from the fluid stream. For example, air intake streams to the passenger cabins of vehicles often include particulate material that is undesirable to one or more of the passengers of the vehicles. It is desirable to remove the particulate matter to enhance the comfort of the passengers and/or for aesthetics. Cabin air filters are being incorporated in vehicles more frequently.

SUMMARY OF THE INVENTION AND ADVANTAGES

The invention provides an air filter assembly including an air filter extending along a central axis from a first end to a second end. The air filter decreases in width along the central axis from the first end to the second end. The air filter assembly also includes a filter housing partially enclosing the air filter and defining an aperture adjacent to the second end. One or more airstreams can be directed through the aperture to the air filter. The air filter assembly also includes at least one valve m ember rotatable about a rotation axis. The valve member pivots around the second end to block at least a portion of the aperture. The cooperation between the narrowing air filter and the movement of the valve member increases surface area of the air filter presented to an air stream directed to the air filter.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross-sectional view of the exemplary embodiment of the invention;

FIG. 2 is a perspective view of a second exemplary air filter;

FIG. 3 is a perspective view of a third exemplary air filter; and

FIG. 4 is a perspective view of a fourth exemplary air filter.

DETAILED DESCRIPTION OF THE PREFERRED EMBODIMENT

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

The invention provides an air filter assembly 10 including an air filter 12 extending along a central axis 14 from a first end 16 to a second end 18. The air filter 12 decreases in width along the central axis 14 from the first end 16 to the second end 18. The first exemplary embodiment of the air filter is dome-like or semi-spherical. The air filter 22 includes appropriate filter media to filter air streams 32, 34 moving to the passenger cabin of a vehicle.

The air filter assembly 10 also includes a filter housing 20 partially enclosing the air filter 12. The first end 16 of the air filter 12 is supported by the filter housing 20 in the exemplary embodiment of the invention. A fan assembly 36 including a fan 38 and a motor 40 is also supported in the filter housing 20. The fan 38 is rotated by the motor 40 to encourage flow of the air streams 32, 34. The filter assembly 20 defines an aperture 22 adjacent to the second end 18. The aperture 22 extends from edges 42, 44. The airstreams 32, 34 are directed through the aperture 22 to the air filter 12. The air streams 32, 34 pass through the aperture 22, the air filter 12, and the filter housing 20 during movement to the passenger cabin of the vehicle.

The air filter assembly 10 also includes at least one valve member 24 rotatable about a rotation axis 26. The rotation axis 26 extends substantially perpendicular to the central axis 14 between the first end 16 and the second end 18. In alternative embodiments of the invention, the rotation axis 26 could extend skewed from perpendicular to the central axis 14 or could be coaxial to the central axis 14. The valve member 24 pivots around the second end 18 to block at least a portion of the aperture 22. The valve member 24 of the exemplary embodiment is an arcuate rigid panel. However, in alternative embodiments of the invention, the valve member 24 could be a fabric valve. Also, in the exemplary embodiment, the rotation axis 26 intersects the central axis 14. However, in alternative embodiments of the invention, the rotation axis 26 could be spaced from the central axis 14.

The cooperation between the shape of the air filter 12 and the movement of the valve member 24 enhances the efficiency of the air filter assembly 10. For example, the air filter 12 presents a greater surface area to the incoming air streams 32, 34 relative to a rectangular filter and allows for more area for the air to pre-swirl into the fan after it exits the filter relative to a rectangular filter. Furthermore, the pivoting movement of the valve member 24 around the air filter 12 allows for a compact envelope for the air filter assembly 10. In FIG. 2, an alternatively shaped conical air filter 12a extends from a wider first end 16a to a narrower second end 18a. In FIG. 3, an alternatively shaped frusto-conical air filter 12b extends from a wider first end 16b to a narrower second end 18b. A flat portion 46b of the air filter 12b could be formed from filter media to increase the surface area presented to incoming air streams. In FIG. 4, an alternatively shaped frusto-spherical air filter 12c extends from a wider first end 16c to a narrower second end 18c. A flat portion 46c of the air filter 12c could be formed from filter media to increase the surface area presented to incoming air streams.

In one exemplary mode of operation, the air filter assembly 10 includes first and second passageways 28, 30 extending in parallel to one another to a side of the valve member 24 opposite the air filter 12. The air stream 32 is directed by the first passageway 28 and communicates outside air to the air filter 12. The air stream 34 is directed by the first passageway 30 and communicates cabin (or recycled) air to the air filter 12. The valve member 24 pivots between first and second positions. In the first position, the valve member 24 contacts the edge 42 and closing the first passageway 28. In the second position, the valve member 24 contacts the edge 44 and closing the first passageway 30. The valve member 24 can be moved among a plurality of positions intermediate the first and second positions to vary the ratio of outside air to recycled air being directed to the air filter 12.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air filter assembly comprising:
   an air filter extending along a central axis from a first end to a second end and decreasing in width along said central axis from said first end to said second end;
   a filter housing partially enclosing said air filter and defining an aperture adjacent to said second end; and
   at least one valve member rotatable about a rotation axis to pivot around said second end and selectively block at least a portion of said aperture;
   wherein said at least one valve member is further defined as an arcuate rigid panel;
   wherein said rotation axis intersects said central axis,
   wherein said at least one valve member is further defined as being operable to block at least substantially half of said aperture
   wherein said air filter is further defined as being one of conical, frusto-conical, semi-spherical, and frusto-spherical.

2. The air filter assembly of claim 1 further comprising:
   first and second passageways extending in parallel to one another to a side of said at least one valve member opposite said air filter wherein said valve member is moveable between a first position closing said first passageway from said air filter and a second position closing said second passageway from said air filter.

3. The air filter assembly of claim 1 wherein said rotation axis and said central axis are substantially perpendicular to one another.

* * * * *